(12) United States Patent
Rider et al.

(10) Patent No.: US 9,811,389 B2
(45) Date of Patent: Nov. 7, 2017

(54) TASK ASSIGNMENT FOR PROCESSOR CORES BASED ON A STATISTICAL POWER AND FREQUENCY MODEL

(71) Applicant: Intel Corporation, Santa Clara, CA (US)

(72) Inventors: Tomer Rider, Naahyria (IL); Lev Faivishevsky, Kfar Saba (IL); Igor Ljubunicic, Yokneam Ilit (IL); Shahar Taite, Kfar Saba (IL); Raphael Sack, Mitzpe Amuka (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/862,510

(22) Filed: Sep. 23, 2015

(65) Prior Publication Data

US 2017/0083383 A1 Mar. 23, 2017

(51) Int. Cl.
G06F 9/46 (2006.01)
G06F 9/50 (2006.01)
G06F 9/48 (2006.01)
G06F 1/32 (2006.01)

(52) U.S. Cl.
CPC ............ G06F 9/5094 (2013.01); G06F 1/329 (2013.01); G06F 9/4893 (2013.01)

(58) Field of Classification Search
None
See application file for complete search history.

(56) References Cited

U.S. PATENT DOCUMENTS

| 2009/0328055 | A1 | 12/2009 | Bose et al. | |
|---|---|---|---|---|
| 2010/0275212 | A1* | 10/2010 | Saha | G06F 9/5027 718/104 |
| 2011/0173432 | A1 | 7/2011 | Cher et al. | |
| 2013/0054179 | A1 | 2/2013 | Shapira et al. | |
| 2013/0074077 | A1 | 3/2013 | Miller et al. | |
| 2014/0059558 | A1* | 2/2014 | Davis | G06F 9/5044 718/103 |
| 2015/0143142 | A1* | 5/2015 | Park | G06F 1/324 713/320 |
| 2015/0169382 | A1 | 6/2015 | Anderson et al. | |

OTHER PUBLICATIONS

Notification of Transmittal of the International Search Report and the Written Opinion of the International Searching Authority, or the Declaration issued for International Patent Application No. PCT/US2016/043344, dated Oct. 24, 2016.

* cited by examiner

*Primary Examiner* — Sisley Kim
(74) *Attorney, Agent, or Firm* — Blakely, Sokoloff, Taylor & Zafman LLP (57) ABSTRACT

A method and apparatus for assigning tasks to processor cores, based on usage history, to have tasks executed at the highest frequency with the lowest power consumption are described. In one embodiment, the apparatus comprises processor cores, an interconnect coupled to the processor cores, at least one memory module coupled to the interconnect, and a task assigning module to assign a first task, based the usage history, to one processor core for execution at maximum frequency with minimum power usage in comparison to other processor cores of the plurality, the usage history being based on monitored core temperature, frequency and power usage for a first set of tasks previously executed by the plurality of processor cores.

24 Claims, 6 Drawing Sheets

TASK ASSIGNMENT FOR PROCESSOR CORES BASED ON A STATISTICAL POWER AND FREQUENCY MODEL

FIELD OF THE INVENTION

Embodiments of the present invention relate to the field of computing systems; more particularly, embodiments of the present invention relate to assigning tasks to processor cores of a computing device according to core power usage and core frequency based on history usage information.

BACKGROUND OF THE INVENTION

Battery life is one of the chief considerations in mobile device design. Various power saving schemes are used and employed to achieve longer results. Most of them are based on peripheral elements and sensors usage and software controls. For example, for wireless devices, the power to the screen may be turned off when not in use. Also, in the software space, tickling the kernel and using background processing have resulted in power savings.

However, on multi-core devices (which are typically included in modern smartphones and tablets), there is no optimization of the power and frequency on the core level inside the processor. Tasks are scheduled by the operating system scheduler based on core vacancy considerations and the locality of pages in processor caches and memory.

Furthermore, the methods above assume that processor cores are identical. However, impurities in silicon result in variations between cores—different power/current usage, different temperature curve, and accordingly different frequency at which the core can or may run when computing a task. This means that the same computational task, when executed on two seemingly identical cores, may result in a certain percentage (%) more power consumption when executed on one core than if executed on the other core, for example, even though execution of the task took the same number of cycles to complete and was executed at the same core frequency.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques for allocating tasks to processing cores in a device are described. The device may be a mobile device (e.g., mobile phone, tablet, laptop computer, etc.), a system-on-a-chip (SoC), a processor, etc. In one embodiment, the tasks are computational tasks from application programs that are being executed, at least in part, by the device.

In one embodiment, task allocation for central processing unit (CPU) processor cores is governed by power and frequency usage and is based on a statistical model that assigns computational tasks to cores that can execute a task at the highest frequency and with minimum power in comparison to other cores. In one embodiment, for each application, assignment of task is performed based on a number of factors, including but not limited to one or more of a power/temp curve measured and recorded for each processor core, plus processor core utilization of individual cores and overall, memory utilization for the task and overall, the time to execute the task, and a history usage trend calculated, created, and used for future (predictive) loading of known applications. In one embodiment, memory locality is also used to make sure the associated pages for the execution of the process are stored in memory banks adjacent to the active/used core to avoid switching context to other cores, and/or slower/more expensive retrieval of pages from far memory banks, resulting in a longer execution and thus higher power utilization.

In one embodiment, in a mobile platform, task allocation works as follows. First the mobile platform monitors temperature, power and frequency per core with one or more measurement points per core. This may be done by middleware running on a mobile platform, with the support of hardware in the mobile device. For example, the monitoring of core temperature may be performed using temperature sensor(s) in each of the processor cores. The monitoring may be done for a predetermined number of application (with their associated tasks) executions.

The platform takes the monitored data and creates behavior curves for each measured metric for each core in a manner well-known in the art. In one embodiment, these curves may take the form of a look up table (LUT) or database of values. These curves are stored in memory for use later when allocating tasks.

When the operating system (OS) needs to schedule a task, in one embodiment, the following occurs. If the task to be allocated is a task, referred to herein as a known task, with previous execution history (e.g., kernel function, loading of binary into memory (e.g., shared object, browser code pages, phone dialer data, etc.)), then the task is assigned to the best-matching core in terms of minimum power usage and maximum core frequency. In one embodiment, if the task a new (i.e., a task without previous execution history), referred to herein as unknown opportunistic task, then the task is allocated by the operating system based on a calculation of minimum average net change in power from the existing statistical data and locality. In one embodiment, the calculation is done using number of statistical models, which are available in the platform firmware. In one embodiment, the curve with the smallest power integral (over measured data points) is preferred. In another embodiment, allocating tasks without previous execution history is done by using power profiles preloaded into the mobile device. In this case, a manufacturer or developer may preload power profiles for applications into the Basic Input/Output System (BIOS) Unified Extensible Firmware Interface (UEFI) for optimized power utilization. These power profiles indicate to which core certain tasks should be assigned in the absence of execution usage history. In one embodiment, these are only used for a pre-determined number of executions of a task or group of tasks (e.g., tasks for the same application). In one embodiment, these power profiles are used to control task allocation until the number of executions equals the amount that are used to create an execution history.

As an example of a power profile, assume Core 1 might be the "coolest"—it runs long computation tasks; Core 2 might be the "hottest"—so it's best for short interrupts or context switches; and Core 3 might give best linear behavior—used for system functions or kernel. This information about individual cores can be used to determine where a task should be allocated.

Figure 1:
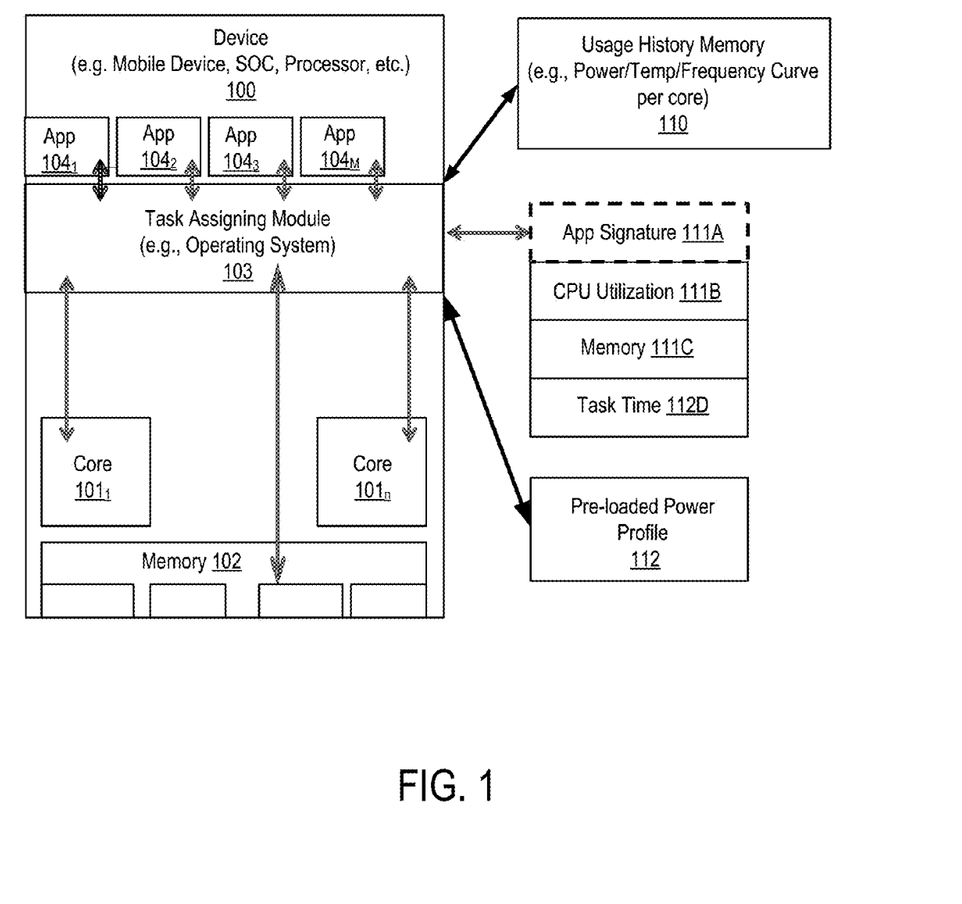
FIG. 1 illustrates a block diagram of a device containing multiple cores and that assigns tasks to cores based on minimum power usage while executing at a maximum frequency.

Embodiments described herein provide one or more of the following benefits: best or improved utilization of each computational resource; power saving (even if due to small variations between resources; and better processing time when tasks are not starved on "hot" cores due to frequency throttling FIG. 1 illustrates a block diagram of a device containing multiple cores that assigns tasks to cores based on minimum power usage while executing at a maximum frequency. The device creates power and temperature curves based on measured, recorded data. These curves, along with processor utilization, memory utilization, task execution time, and a history usage trend calculated, created, and used for future predictive loading with known applications, are utilized to assign tasks. In one embodiment, the trends are created based on the power data points collected by the platform from CPU registers (like any other counter) and stored in the platform memory (e.g., a Flash-based memory), and referenced during execution. For improved execution, the power curves are loaded and/or periodically updated into one of the last level (LL) caches in each processor.

Referring to FIG. 1, device 100 may comprise a mobile device, a system-on-a-chip (SoC), a processor, or any other device with multiple cores for executing tasks. The tasks may be part of an application or other program code.

Device 100 includes processor cores $101_1$-$101_N$. Note that while only two cores are shown, the device 100 may have three or more cores as well. Device 100 also includes memory, 102 which is used by cores $101_1$-$101_N$ to perform tasks.

Task assigning module 103 receives tasks from applications such as applications $101_1$-$101_M$ and uses usage history information stored in usage history memory 110 along with CPU utilization information 111B, memory utilization information 111C, and task time 112D, to assign tasks to core $101_1$-$101_N$. Note that in alternative embodiments, a subset of this information is used by task assigning module 103 to assign tasks.

In one embodiment, task assigning module 103 comprises an operating system. The operating system accesses usage history memory 110 to obtain the usage history. In one embodiment, the usage history may include multiple power and temperature curves per core. In one embodiment, there is a mathematical model/formula linking power, temperature, and frequency, or a subset of them, available and programmable in the platform level firmware.

In one embodiment, task assigning module 103 receives application signature 111A and uses the application signature 111A to determine if there is usage history available in memory 110 for the task that is to be allocated.

Task assigning module 103 also obtains CPU utilization information 111B that indicates current utilization of the cores. In one embodiment, the CPU utilization information 111B includes the processor utilization for a task (i.e., an indication of the amount of the processor core needed to complete the task (e.g., percentage, cycles, or any amount that can be translated into power utilization)) and the overall processor utilization of the core (i.e., an indication (e.g., percentage) of the amount processor core resources are currently being used on the device) during the task. In one embodiment, memory utilization information 111C indicates the memory utilization associated with execution of the task in question as well as the overall memory utilization by the processor core (and other processes) during the task execution. Using the usage history information from memory 110 along with the CPU utilization information 111B, the memory utilization information 111C and the task time information 112D indicative of the time to execute the task, task assignment module 103 determines to which core to assign a task.

Note that if no usage history information is available, task assigning module 103 performs a power calculation to determine where to allocate the task in one embodiment or uses pre-loaded power profiles 112 to determine where to allocate the task in another embodiment. In one embodiment, the power calculation determines the power necessary to execute the task on each available core and then analyzing or profiling of cores is performed to choose the one with the least power usage.

Figure 2:
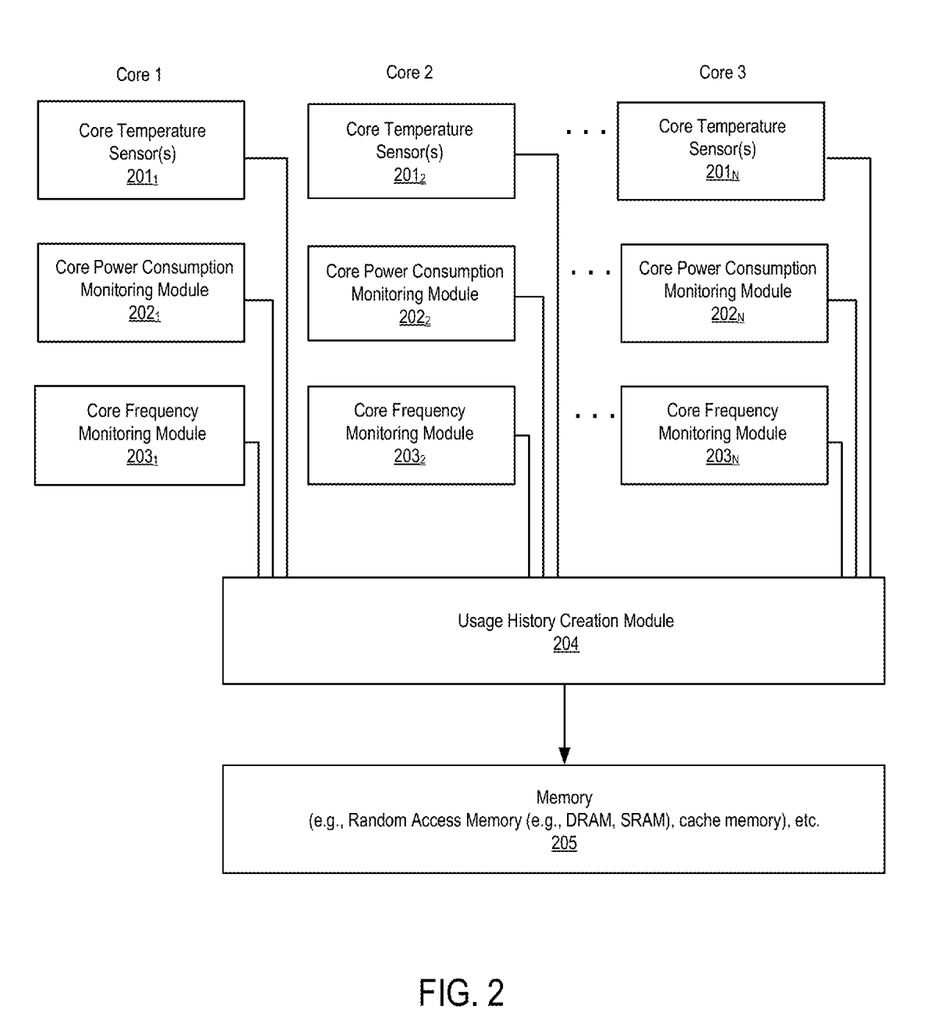
FIG. 2 is a block diagram of a usage history apparatus.

FIG. 2 is a block diagram of a usage history apparatus. The apparatus may include hardware (circuitry, dedicated logic, etc.), software (such as is run on a general purpose computer system or a dedicated machine), firmware, or a combination of the three.

Referring to FIG. 2, temperature sensor(s) $201_1$-$201_N$ measures temperature at one or more locations in Core 1. In one embodiment, Core 1 is Core $101_1$ of FIG. 1. Measured temperature data is sent to usage history creation module 204.

Core power consumption monitoring module $202_1$ measures the power consumption of Core 1 and provides the measurements to usage history creation module 204. In one embodiment, core power consumption module $202_1$ determines power consumption by multiplying core voltage by core frequency and core capacitance. In another embodiment, core power consumption monitoring module $202_1$ measures the core's power consumption by measuring the current drain by the core voltage drop. In one embodiment, power consumption monitoring module 201 also measures the power leakage of a core. This may be performed by measuring leakage current of the core. Leakage current may be used in combination of the temperature and the voltage drop of the core to obtain power leakage and trending information of the core. Power consumption monitoring module $202_1$ sends the power consumption data to usage history creation module 204.

Core frequency monitoring module $203_1$ measures the operating frequency of a core. In one embodiment, this may be done by monitoring the programming (e.g., registers) of the clock generator (e.g., phase locked loop (PLL)) to determine what frequency the clock generator is set to provide the core. In another embodiment, the actual frequency is measured. Information regarding the monitored clock frequency is provided to usage history creation module 204.

In one embodiment, the same data is provided for core 2 through core N. Note as before, in an alternative embodiment, the device may only have two cores.

Note that while FIG. 2 shows each core having separate temperature sensors, core power consumption monitoring module, and a core frequency monitoring module, in alternative embodiments, one or more of these modules are shared by the cores. Even so, in these situations, the data from each of these modules would be provided for each of the cores to usage history creation module 204.

Based on the data received by usage history creation module 204, a usage history is created. In one embodiment, usage history creation module 204 comprises middleware receiving on the device containing the cores. The usage history may include power/temperature/frequency curves for each of the cores. The usage history information may also include trending information based on historical data that is able to predict thus execution layoff for known tasks. In one embodiment, this is done offband, periodically, when power/CPU utilization is low.

Usage history creation module 204 creates a history 210 that is stored in memory 205. In one embodiment, memory 205 is part of the device containing the cores. In another embodiment, memory is external to the device containing the cores. In one embodiment, memory 205 may comprise random access memory (e.g., RAM) (e.g., static RAM, dynamic RAM, cache memory, flash memory, etc.).

Figure 3:
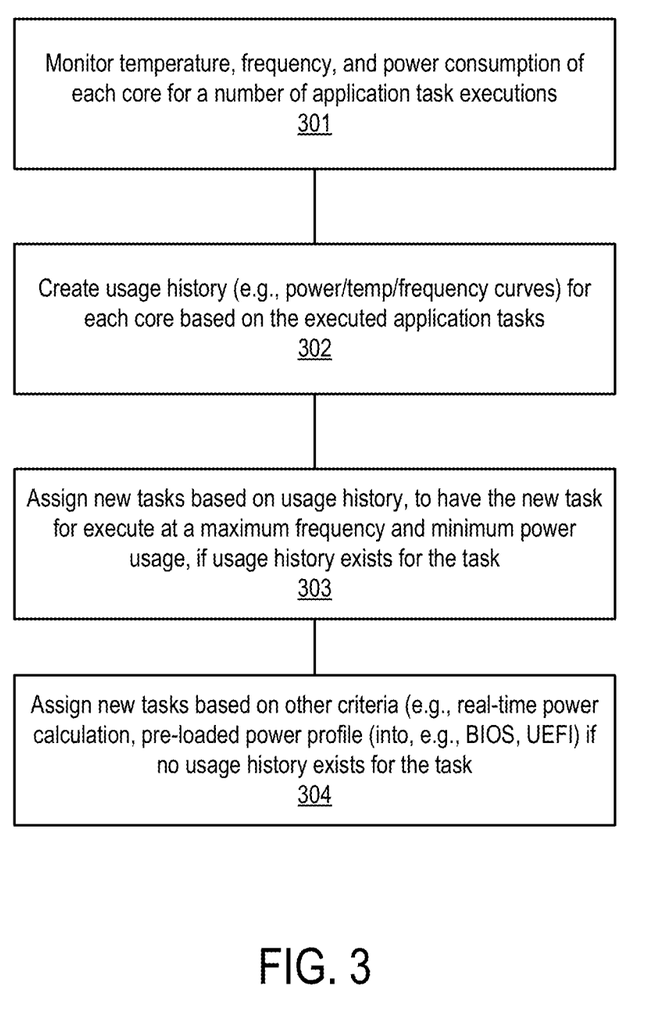
FIG. 3 is a flow diagram of a process for allocating tasks.

FIG. 3 is a flow diagram of a process for allocating tasks. The process is performed by processing logic that may comprise hardware (circuitry, dedicated logic, etc.), software (such as is run on a general purpose computer system or a dedicated machine), firmware or a combination of these three. In one embodiment, the process is performed with the device shown in FIGS. 1 and 2.

Referring to FIG. 3, the process begins by monitoring temperature, frequency and power usage of each core for a number of application task executions (processing block 301).

Using the information, processing logic creates usage history (e.g., power/temp/frequency curves) for each core for the executed application tasks executed by that core (processing block 302).

Processing logic assigns new tasks, based on the created usage history, to cores for execution at a maximum frequency and minimum power usage, if usage history exists for the tasks (processing block 303). In one embodiment, the assignment is also based on processor core utilization (individual, overall or both), memory utilization (for the task executions, overall by all cores, or both), and/or task time.

Processing logic assigns new tasks based on other criteria (e.g., real-time power calculation, pre-loaded power profile (loaded into, e.g., BIOS, UEFI) if no usage history exists for the tasks (processing block 304).

In one embodiment, the platform operates on two levels: 1) historical behavior trend, which is used to predict best execution location for known tasks, and 2) momentary real-time calculation (e.g., a minimum average net change in power calculated from existing statistical data and memory locality, etc.) and mapping of power for opportunistic tasks (i.e., tasks with no historical data). In one embodiment, mapping of power refers to a real-time snapshot of the current power utilization when no historic data is available. If the history is only available for other cores, it can be treated as no history available, meaning that power mapping is required. An example scenario of executing tasks on such a platform may include the following. First, a platform OS receives and needs to run a task (e.g., a task from a browser).

The browser signature associated with the task is a known entry in the usage history of the platform and the loading of its memory pages from the disk and into the memory is known. In other words, the memory pages that need to be loaded, including the memory, are known. The usage history of the platform has history graphs for each core and knows how each core will respond to performing the task if assigned, including the increase of temperature/current and the frequency response.

The OS accesses the usage history and calculates permutations for the cores executing the task. The results of these calculations will include the optimal permutation that will guarantee minimal change in power utilization while allowing the highest clock speed for execution among the cores. The core associated with the optimal permutation is assigned the task.

Once the assignment has occurred, the platform loads pages associated with the task into local memory (e.g., NUMA principle) to match the core being assigned the task. Then the platform begins executing tasks accordingly In one embodiment, for tasks without usage history, such as unknown data pages (e.g., browser tabs opening, movies playing), these opportunistic tasks with no known pattern or history, they are performed in the manner than does not compromise the earlier scheduling of other tasks and guarantees minimal addition in power usage. For example, unknown data pages are loaded into memory/cores in a manner that doesn't impact the earlier scheduling.

As other tasks are scheduled, similar considerations are made to guarantee execution at maximum frequency for each core with minimal change in power.

Figure 4:
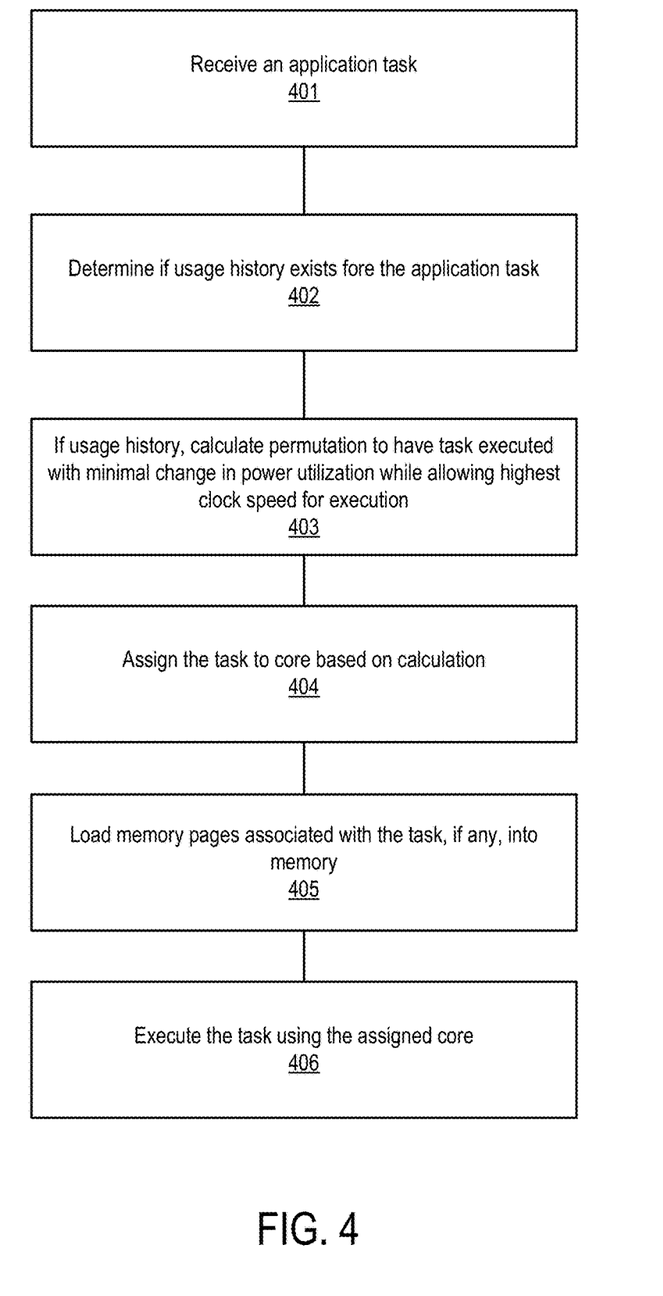
FIG. 4 is a flow diagram of an alternative embodiment of a process for allocating tasks.

FIG. 4 is a flow diagram of an alternative embodiment of a process for allocating tasks. The process is performed by processing logic that may comprise hardware (circuitry, dedicated logic, etc.), software (such as is run on a general purpose computer system or a dedicated machine), firmware or a combination of these three.

The process begins by processing logic receiving an application task (processing block 401) and determining if usage history exists for the task (processing block 402). In one embodiment, the determination is made based on the application signature. Alternatively, the determination is made based on one or more of mapping of pages into memory, a specific system call or instruction for applications that support and have been compiled with the above power management model on supported Intel Architecture (IA) platforms.

If usage history exists, processing logic calculates a permutation that causes a task to be assigned where it's execution results in a minimal change in power utilization while allowing the highest clock speed for execution (processing block 403).

Based on the calculation, processing logic assigns a task to a core (processing block 404) and loads memory pages associated with the task, if any, into memory (processing block 405). Thereafter, processing logic executes a task using the assigned core (processing block 406).

An Example of a Mathematical Model

In one embodiment, a mathematical model is used to determine, at least in part, the task assignment. Note that the teachings herein are not limited to this model, and additional models may be used. The capability to use different models can be made fully programmable through a management interface (e.g. UEFI/AMT) through firmware updates.

In one embodiment, in order to assign a task to a core, the operating system uses a predictive machine learning method. The machine learning method creates a usage pattern of the device by: monitoring of the tasks execution times per <defined quantum of time>; monitoring of the processor utilization levels for each group of similar tasks and overall processor utilization per <defined quantum of time>, where similar tasks are task for the same application in one embodiment; and monitoring of the memory utilization levels for each group of similar tasks and overall memory utilization per <defined quantum of time>, where similar task are tasks for the same application in one embodiment.

In one embodiment, each group consists of tasks originated by the same application. Subgroups may be created according to the specific part of the day the task is executed. The monitoring of the application execution results in the collection of the following information about each task i executed:

$C_i$—the core executing the task
$F_i$—the frequency chosen
$U_i^{task}$—processor utilization for a task (e.g., % of processor core used to execute the task)
$U_i^{overall}$—overall processor utilization during task execution (e.g., % of all processor cores used)
$M_i^{task}$—memory utilization for a task (e.g., % of memory needed to complete the task)
$M_i^{overall}$—overall memory utilization during task execution (e.g., % of overall memory needed during task execution by all task being executed)
Vi—processor core voltage
$T_i$—task execution time The execution modeling stage preprocesses gathered data. First, based on the measurements, the dynamic power consumption $P_i$ is estimated. In one embodiment, the estimation is computed as:

$$P_i = Cap_c * V_i^2 * F_i$$

where $Cap_c$ is the capacitance of the core c, executing the task.

After the data collected for N (a predefined parameter) executions of the application, the statistical modeling estimates $Prob^H_c(P, T, F, U_i^{task}, U_i^{ol}, M_i^{task}, M_i^{ov})$—the joint distribution of power P, execution time T, frequency F and the processor and memory utilizations $U_i^{task}, U_i^{ov}, M_i^{task}, M_i^{ov}$ for each core c per hour H with the help of the multivariate normal distribution. For that purpose, the average hourly execution time $ET_c$, average hourly power consumed $EP_c$ and average frequency used $EF_c$, average hourly task and global processor and memory utilizations $EU_i^{task}, EU_i^{ov}, EM_i^{task}, EM_i^{ov}$ are computed. The covariance matrix $\Sigma_c (P, T, F, U_i^{task}, U_i^{ov}, M_i^{task}, M_i^{ov})$ is calculated after that as well as its determinant $|\Sigma_c|$. Thus the probability density $f_x$ of a random seven dimensional vector x composed of P, T, F, $U^{task}, U^{ov}, M^{task}, M^{ov}$ is estimated as:

$$f^{c,h}_{(P,T,F,U^{task},U^{ov},M^{task},M^{ov})} = \frac{1}{\sqrt{(2\pi)^7 |\Sigma_c|}} \exp(-(x-\mu_c)\sum\nolimits_c^{-1}(x-\mu_c))$$

where vector $\mu_c$ is the vector of averages ($EP_c, ET_c, EF_c, EU^{task}, EU^{ovr}, EM^{task}, EM^{ov}$).

In one embodiment, the optimal core $c_o$ and the adjusted frequency $f_o$ are chosen to perform the task within an estimated execution time with the lowest power consumption according to hour h of the day, and current processor utilization $u_o$ and memory utilization $m_o$.

$$c_o, f_o = \arg \min \int Pd Prob_{c,h}(P,F,T,U^{task},U^{ov},M^{task},M^{ov}|F=f_o, U^{ov}=u_o, M^{ov}=m),$$

$$s.t. \int Td Prob_{c,h}(P,F,U^{task},U^{ov},M^{task},M^{ov}|F=f_o, U^{ov}=u_o, M^{ov}=m) \le ET$$

Such a Gaussian is well-known in the art.

In an alternative embodiment, the optimal core is chosen to perform the task in the fastest manner within estimated power consumption level.

$$c_o, f_o = \arg \min \int Td Prob_{c,h}(P,F,T,U^{task},U^{ov},M^{task},M^{ov}|F=f_o, U^{ov}=u_o, M^{ov}=m),$$

$$s.t. \int Pd Prob_{c,h}(P,F,T,U^{task},U^{ov},M^{task},M^{ov}|F=f_o, U^{ov}=u_o, M^{ov}=m) \le EP$$

Figure 5:
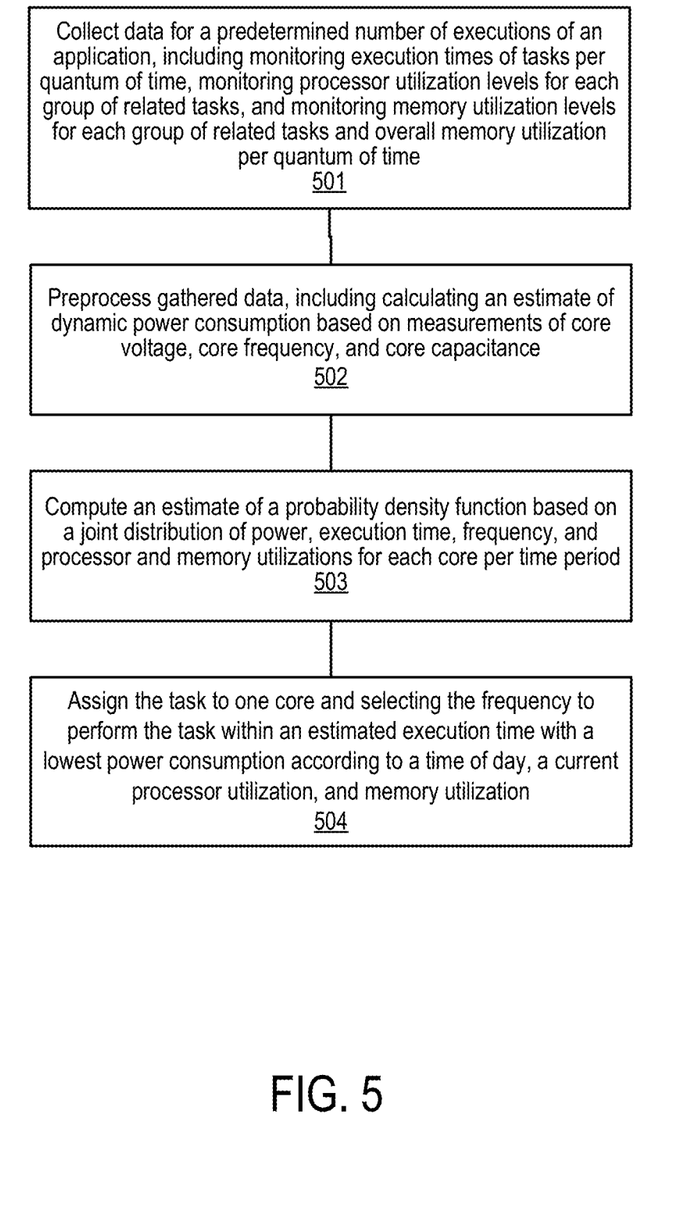
FIG. 5 is a flow diagram of an embodiment of a process for computing a permutation.

FIG. 5 is a flow diagram of an embodiment of a process for computing a permutation. The process is performed by processing logic that may comprise hardware (circuitry, dedicated logic, etc.), software (such as is run on a general purpose computer system or a dedicated machine), firmware or a combination of these three.

Referring to FIG. 5, processing logic collects data for a predetermined number of executions of an application, including monitoring execution time of tasks per quantum of time (e.g., an hour, predetermined number of minutes), monitoring processor utilization levels for each group of related tasks, and monitoring memory utilization levels for each group of related tasks and overall memory utilization per quantum of time (processing block 501).

After collecting the data, or collecting a portion thereof, processing logic preprocesses gathered data, including calculating an estimate of dynamic power consumption based on measurements of core voltage, core frequency, and core capacitance (processing block 502).

Next, processing logic computes an estimate of a probability density function based on a joint distribution of power, execution time, frequency, and power and memory utilization for each core per time period (processing block 503).

Based on the probability of the density function, processing logic assigns the task to a processor core and selects a frequency to perform the task within an estimated execution time with a lowest power consumption according to the time of day, current processor utilization and memory utilization (processing block 504).

Figure 6:
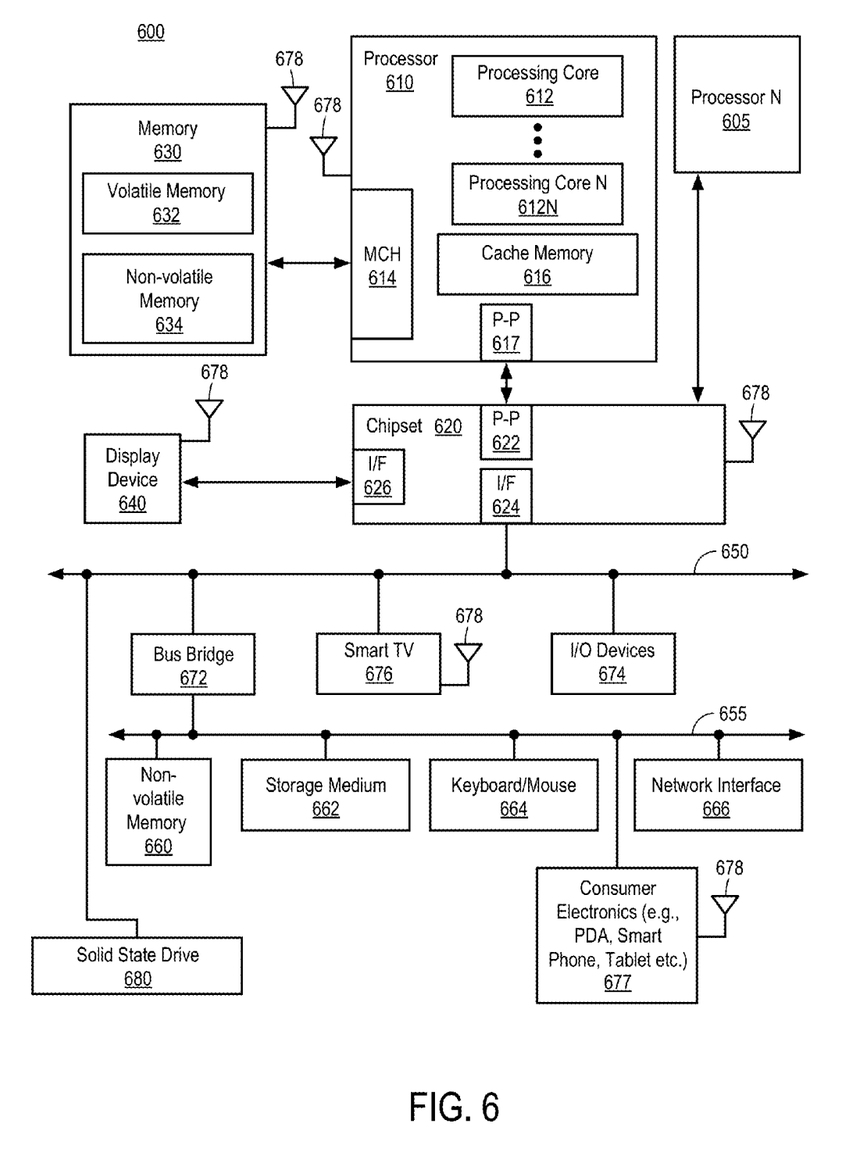
FIG. 6 illustrates one embodiment of a system level diagram.

In order to allow the optimal power, the following vectors may also be used to create additional task to processor core mapping. First, in one embodiment, known binary hashes/application signatures are used and assigned to cores based on the known power/frequency patterns established from previous measurement (which can be absolute, daily, moving or averages, etc.). In another embodiment, "coolest" cores are used for long computations, while "hottest" cores are used for short tasks. Thus a media player decoder/encoder may then be loaded accordingly into the cool core, whereas graphical user interface (GUI) pages will be loaded into the hot one. In one embodiment, computation for unknown binary payload and dynamic execution data pages will be calculated as above, with grouping per application FIG. 6 is one embodiment of a system level diagram 600 that may incorporate the techniques described above. For example, the techniques described above may be incorporated into a processor in system 600.

Referring to FIG. 6, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 600 implements the methods disclosed herein and may be a system on a chip (SOC) system.

In one embodiment, processor 610 has one or more processor cores 612 to 612N, where 612N represents the Nth processor core inside the processor 610 where N is a positive integer. In one embodiment, system 600 includes multiple processors including processors 610 and 605, where processor 605 has logic similar or identical to logic of processor 610. In one embodiment, system 600 includes multiple processors including processors 610 and 605 such that processor 605 has logic that is completely independent from the logic of processor 610. In such an embodiment, a multi-package system 600 is a heterogeneous multi-package system because the processors 605 and 610 have different logic units. In one embodiment, processing core 612 includes, but is not limited to, pre-fetch logic to fetch instructions, decode logic to decode the instructions, execution logic to execute instructions and the like. In one embodiment, processor 610 has a cache memory 616 to cache instructions and/or data of the system 600. In another embodiment of the invention, cache memory 616 includes level one, level two and level three, cache memory, or any other configuration of the cache memory within processor 610.

In one embodiment, processor 610 includes a memory control hub (MCH) 614, which is operable to perform functions that enable processor 610 to access and communicate with a memory 630 that includes a volatile memory 632 and/or a non-volatile memory 634. In one embodiment, memory control hub (MCH) 614 is positioned outside of processor 610 as an independent integrated circuit.

In one embodiment, processor 610 is operable to communicate with memory 630 and a chipset 620. In such an embodiment, SSD 680 executes the computer-executable instructions when SSD 680 is powered up.

In one embodiment, processor 610 is also coupled to a wireless antenna 678 to communicate with any device configured to transmit and/or receive wireless signals. In one embodiment, wireless antenna interface 678 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory (e.g., NAND, NOR), phase change memory (PCM), read-only memory (ROM), electrically erasable programmable read-only memory (EEPROM), or any other type of non-volatile memory device.

Memory 630 stores information and instructions to be executed by processor 610. In one embodiment, chipset 620 connects with processor 610 via Point-to-Point (PtP or P-P) interfaces 617 and 622. In one embodiment, chipset 620 enables processor 610 to connect to other modules in the system 600. In one embodiment, interfaces 617 and 622 operate in accordance with a PtP communication protocol such as the Intel QuickPath Interconnect (QPI) or the like.

In one embodiment, chipset 620 is operable to communicate with processor 610, 605, display device 640, and other devices 672, 676, 674, 660, 662, 664, 666, 677, etc. In one embodiment, chipset 620 is also coupled to a wireless antenna 678 to communicate with any device configured to transmit and/or receive wireless signals.

In one embodiment, chip set 620 connects to a display device 640 via an interface 626. In one embodiment, display device 640 includes, but is not limited to, liquid crystal display (LCD), plasma, cathode ray tube (CRT) display, or any other form of visual display device. In addition, chipset 620 connects to one or more buses 650 and 655 that interconnect various modules 674, 660, 662, 664, and 666. In one embodiment, buses 650 and 655 may be interconnected together via a bus bridge 672 if there is a mismatch in bus speed or communication protocol. In one embodiment, chipset 620 couples with, but is not limited to, a non-volatile memory 660, a mass storage device(s) 662, a keyboard/mouse 664, and a network interface 666 via interface 624, smart TV 676, consumer electronics 677, etc.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 6 are depicted as separate blocks within the system 600, the functions performed by some of these blocks may be integrated within a single semiconductor circuit or may be implemented using two or more separate integrated circuits.

Some embodiments pertain to Example 1 that includes an apparatus comprising a plurality of processor cores, at least one memory module coupled to the plurality of processor cores and a task assigning module to assign a first task, based the usage history, to one processor core for execution at maximum frequency with minimum power usage in comparison to other processor cores of the plurality, the usage history being based on monitored core temperature, frequency and power usage for a first set of tasks previously executed by the plurality of processor cores.

Example 2 includes the subject matter of Example 1, further comprising a usage history creation module to create a usage history for each processor core of plurality of processor cores based on the monitored core temperature, frequency and power usage for the processor cores when executing the first set of tasks.

Example 3 includes the subject matter of Example 2, further comprising a plurality of temperature sensors to monitor temperatures of processor cores while executing the first set of tasks, a core frequency monitoring module to monitor core frequency of each processor core of for the first set of tasks being executed by said each processor core, and a core power consumption monitoring module to monitor core power usage of each processor core of for the first set of tasks being executed by said each processor core.

Example 2 includes the subject matter of Example 1, wherein the usage history indicates that the one core to which the first task is assigned will use less power to execute the first task at a maximum clock speed in comparison to other cores in the multicore processor.

Example 5 includes the subject matter of Example 1, wherein the task assigning module is operable to assign the first task includes to execute with the one processor core operating at a maximum clock speed with minimal change in power utilization.

Example 6 includes the subject matter of Example 1, wherein the usage history comprises core usage, memory usage and time information recorded while monitoring execution of the first set of tasks.

Example 7 includes the subject matter of Example 1, wherein the usage history includes information indicative of behavior curves for a plurality of measured metrics including, at least, core temperature, core frequency and core power.

Example 8 includes the subject matter of Example 1, further comprising a usage history creation module to create a usage history by calculating a history usage trend based on the usage history.

Example 9 includes the subject matter of Example 1, wherein the task assigning module is operable to assign a second task to one of the processor cores based on a real-time power calculation.

Example 10 includes the subject matter of Example 1, wherein the task assigning module is operable to assign a second task to one of the processor cores based on a preloaded power profile for an application of which the second task is from, if no usage history exists for the second task.

Example 11 includes the subject matter of Example 10, wherein the power profile are pre-loaded into Basic Input/Output System (BIOS) or Unified Extensible Firmware Interface (UEFI).

Example 12 includes the subject matter of Example 1, the history usage information for each core indicates an expected response by each processor core to a computation, including temperature and current increase and frequency response.

Example 13 includes the subject matter of Example 1, wherein the task assigning module is operable to assign the first task to the one processor core and selects an adequate frequency to perform the first task within an estimated execution time with a power consumption lower than at least one other core of the processor cores.

Some embodiments pertain to Example 14 that includes a method comprising monitoring core temperature, core frequency and core power usage of each processor core of a multicore processor for a first set of tasks being executed by said each processor core, creating a usage history for each processor core based on monitored core temperature, frequency and power usage for the first set of tasks, and assigning a first task, based the usage history, to one processor core for execution at maximum frequency with minimum power usage in comparison to other processor cores of the multicore processor.

Example 15 includes the subject matter of Example 14, wherein assigning the first task includes causes the first task to execute with the one processor core operating at a maximum clock speed with minimal change in power utilization.

Example 16 includes the subject matter of Example 14, wherein the usage history includes information indicative of behavior curves for a plurality of measured metrics including, at least, core temperature, core frequency and core power.

Example 17 includes the subject matter of Example 14, further comprising assigning a second task to one of the processor cores based on a real-time power calculation.

Example 18 includes the subject matter of Example 14, further comprising assigning a second task to one of the processor cores based on a preloaded power profile for an application of which the second task is from, if no usage history exists for the second task.

Example 19 includes the subject matter of Example 18, further comprising preloading the power profile into Basic Input/Output System (BIOS) or Unified Extensible Firmware Interface (UEFI).

Example 20 includes the subject matter of Example 14, wherein assigning the first task to the one core comprises selecting a core and adequate frequency to perform the first task within an estimated execution time with a power consumption lower than at least one other core of the multicore processor.

Some embodiments pertain to Example 21 that includes a non-transitory computer-readable storage medium having instructions stored therein, which when executed by a device, cause the device to perform a method comprising receiving a task, analyzing the task to determine if usage history information exists for the task, assigning the task to a processor core of a plurality of processor cores in the device, based on usage history information, for execution at maximum frequency with minimum power usage in comparison to other processor cores of the multicore processor, the usage history being based on monitored core temperature, frequency and power usage for a first set of tasks previously executed by the plurality of processor cores, and executing the task with the processor core.

Example 22 includes the subject matter of Example 21, wherein the usage history information is generated using statistical power and frequency model that assigns tasks to processor cores with minimum power and highest frequency.

Example 23 includes the subject matter of Example 21, wherein the method further comprises: collecting data for a predetermined number of executions of an application, including monitoring execution times of tasks per quantum of time, monitoring processor utilization levels for each group of related tasks, monitoring memory utilization levels for each group of related tasks and overall memory utilization per quantum of time, and preprocessing gathered data, including calculating an estimate of dynamic power consumption based on measurements of core voltage, core frequency, and core capacitance; and computing an estimate of a probability density function based on a joint distribution of power, execution time, frequency, and processor and memory utilizations for each core per time period.

Example 24 includes the subject matter of Example 21, wherein assigning the task to the processor core comprises assigning the task to one core and selecting the frequency to perform the task within an estimated execution time with a lowest power consumption according to a time of day, a current processor utilization, and memory utilization.

Example 25 includes the subject matter of Example 21, wherein assigning the task to the processor core is based on determining the processor core performs the task in the fastest manner within an estimated power consumption level in comparison to other processor cores in the device.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc. Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
    a plurality of processor cores;
    at least one memory coupled to the plurality of processor cores; and
    task assigning circuitry to assign a first task, based the usage history, to one processor core for execution at maximum frequency with minimum power usage in comparison to other processor cores of the plurality, the usage history being based on monitored core temperature, frequency and power usage for a first set of tasks previously executed by the plurality of processor cores, wherein the usage history is created by collecting data for a predetermined number of executions of an application, including monitoring execution times of tasks per quantum of time, monitoring processor utilization levels for each group of related tasks, monitoring memory utilization levels for each group of related tasks and overall memory utilization per quantum of time, and preprocessing gathered data, including calculating an estimate of dynamic power consumption based on measurements of core voltage, core frequency, and core capacitance; and computing an estimate of a probability density function based on a joint distribution of power, execution time, frequency, and processor and memory utilizations for each core per time period.

2. The apparatus defined in claim 1 further comprising usage history creation circuitry to create a usage history for each processor core of the plurality of processor cores based on the monitored core temperature, frequency and power usage for the processor cores when executing the first set of tasks.

3. The apparatus defined in claim 2 further comprising:
    a plurality of temperature sensors to monitor temperatures of processor cores while executing the first set of tasks;
    core frequency monitoring circuitry to monitor core frequency of each processor core of for the first set of tasks being executed by said each processor core; and
    core power consumption monitoring circuitry to monitor core power usage of each processor core of for the first set of tasks being executed by said each processor core.

4. The apparatus defined in claim 1 wherein the usage history indicates that the one core to which the first task is assigned will use less power to execute the first task at a maximum clock speed in comparison to other cores in the multicore processor.

5. The apparatus defined in claim 1 wherein the task assigning circuitry is operable to assign the first task for execution with the one processor core operating at a maximum clock speed with minimal change in power utilization.

6. The apparatus defined in claim 1 wherein the usage history comprises core usage, memory usage and time information recorded while monitoring execution of the first set of tasks.

7. The apparatus defined in claim 1 wherein the usage history includes information indicative of behavior curves for a plurality of measured metrics including, at least, core temperature, core frequency and core power.

8. The apparatus defined in claim 1 further comprising usage history creation circuitry to create a usage history by calculating a history usage trend based on the usage history.

9. The apparatus defined in claim 1 wherein the task assigning circuitry is operable to assign a second task to one of the processor cores based on a real-time power calculation.

10. The apparatus defined in claim 1 wherein the task assigning circuitry is operable to assign a second task to one of the processor cores based on a preloaded power profile for an application of which the second task is from, if no usage history exists for the second task.

11. The apparatus defined in claim 10 wherein the power profile are pre-loaded into Basic Input/Output System (BIOS) or Unified Extensible Firmware Interface (UEFI).

12. The apparatus defined in claim 1 wherein the history usage information for each core indicates an expected response by each processor core to a computation, including temperature and current increase and frequency response.

13. The apparatus defined in claim 1 wherein the task assigning circuitry is operable to assign the first task to the one processor core and selects an adequate frequency to perform the first task within an estimated execution time with a power consumption lower than at least one other core of the processor cores.

14. A method comprising:
   monitoring core temperature, core frequency and core power usage of each processor core of a multicore processor for a first set of tasks being executed by said each processor core, wherein monitoring core temperature, core frequency and core power usage of each processor core of a multicore processor includes collecting data for a predetermined number of executions of an application, including monitoring execution times of tasks per quantum of time, monitoring processor utilization levels for each group of related tasks, monitoring memory utilization levels for each group of related tasks and overall memory utilization per quantum of time, and preprocessing gathered data, including calculating an estimate of dynamic power consumption based on measurements of core voltage, core frequency, and core capacitance;
   computing an estimate of a probability density function based on a joint distribution of power, execution time, frequency, and processor and memory utilizations for each core per time period;
   creating a usage history for each processor core based on monitored core temperature, frequency and power usage for the first set of tasks, the usage history including the estimate of the probability density function for each core per time period; and
   assigning a first task, based on the usage history, to one processor core for execution at maximum frequency with minimum power usage in comparison to other processor cores of the multicore processor.

15. The method defined in claim 14 wherein assigning the first task includes causes the first task to execute with the one processor core operating at a maximum clock speed with minimal change in power utilization.

16. The method defined in claim 14 wherein the usage history includes information indicative of behavior curves for a plurality of measured metrics including, at least, core temperature, core frequency and core power.

17. The method defined in claim 14 further comprising assigning a second task to one of the processor cores based on a real-time power calculation.

18. The method defined in claim 14 further comprising assigning a second task to one of the processor cores based on a preloaded power profile for an application of which the second task is from, if no usage history exists for the second task.

19. The method defined in claim 18 further comprising preloading the power profile into Basic Input/Output System (BIOS) or Unified Extensible Firmware Interface (UEFI).

20. The method defined in claim 14 wherein assigning the first task to the one core comprises selecting a core and adequate frequency to perform the first task within an estimated execution time with a power consumption lower than at least one other core of the multicore processor.

21. A non-transitory computer-readable storage medium having instructions stored therein, which when executed by a device, cause the device to perform a method comprising:
   collecting data for a predetermined number of executions of an application, including monitoring execution times of tasks per quantum of time, monitoring processor utilization levels for each group of related tasks, monitoring memory utilization levels for each group of related tasks and overall memory utilization per quantum of time, and preprocessing gathered data, including calculating an estimate of dynamic power consumption based on measurements of core voltage, core frequency, and core capacitance;
   computing an estimate of a probability density function based on a joint distribution of power, execution time, frequency, and processor and memory utilizations for each core per time period;
   receiving a task;
   analyzing the task to determine if usage history information exists for the task;
   assigning the task to a processor core of a plurality of processor cores in the device, based on usage history information, for execution at maximum frequency with minimum power usage in comparison to other processor cores of the multicore processor, the usage history being based on monitored core temperature, frequency and power usage for a first set of tasks previously executed by the plurality of processor cores and including the probability density function; and
   executing the task with the processor core.

22. The non-transitory computer-readable storage medium defined in claim 21 wherein the usage history information is generated using statistical power and frequency model that assigns tasks to processor cores with minimum power and highest frequency.

23. The non-transitory computer-readable storage medium defined in claim 21 wherein assigning the task to the processor core comprises assigning the task to one core and selecting the frequency to perform the task within an estimated execution time with a lowest power consumption according to a time of day, a current processor utilization, and memory utilization.

24. The non-transitory computer-readable storage medium defined in claim 21 wherein assigning the task to the processor core is based on determining the processor core performs the task in the fastest manner within an estimated power consumption level in comparison to other processor cores in the device.

\* \* \* \* \*